United States Patent [19]

Rockwell et al.

[11] Patent Number: 4,958,908
[45] Date of Patent: Sep. 25, 1990

[54] BANDWIDTH-PRESERVING BRILLOUIN PHASE CONJUGATE MIRROR AND METHOD

[75] Inventors: Davis A. Rockwell, Santa Monica; Richard C. Lind, Woodland Hills; David M. Pepper, Malibu, all of Calif.

[73] Assignee: Hughes Aircraft Company, Los Angeles, Calif.

[21] Appl. No.: 323,649

[22] Filed: Mar. 15, 1989

[51] Int. Cl.$^5$ .............................................. G02B 27/10
[52] U.S. Cl. .................................................. 350/311
[58] Field of Search ........................................ 350/311

[56] References Cited

PUBLICATIONS

B. Ya et al., "Connection Between the Wave Fronts of the Reflected and Exciting Light in Stimulated Mandel'Shtam-Brillouin Scattering" JETP Lett. 15, (1972), pp. 109-115.
V. V. Shkunov et al., "Optical Phase Conjugation", Scientific American, Dec. 1985, pp. 54-59.
D. M. Pepper, "Applications of Optical Phase Conjugation", Scientific American, Jan. 1986, pp. 74-83.
D. M. Pepper, "Nonlinear Optical Phase Conjugation", Laser Handbook vol. 4, Elsevier Science Publishers VG. 1985, pp. 333-334; 409, 454, 455-462.
N. F. Andreev et al., "Wave-front Inversion of Weak Optical Signals with a Large Reflection Coefficient", JETP Lett. vol. 32, No. 11, 12/5/80, pp. 625-629.
N. G. Basov, et al., "Phase Fluctuations of the Stokes Wave Produced as a Result of Stimulated Scattering of light", JETP Lett. 31, 1980, pp. 645-649.
N. G. Basov et al., "Investigation of a Hypersonic Wavefront-Reversing Mirror Operating in a Maser-Oscillator-Amplifier Configuration", Sov. J. Quantum Electron, 16 (6), Jun. 1986, pp. 788-791.
V. F. Efimkov et al., "Polarization Methods for Improvement of the Energy Characteristics of Wavefront-Reversing Mirros", Sov. J. Quantum Electron. 14 (2), Feb. 84, pp. 209-213.

Primary Examiner—Bruce Y. Arnold
Assistant Examiner—Rebecca D. Gass
Attorney, Agent, or Firm—V. D. Duraiswamy; W. K. Denson-Low

[57] ABSTRACT

A coherent input beam from a laser is fed into a Brillouin-enhanced four wave mixer which generates a phase conjugated seed beam in counterpropagation with the input beam. A brillouin amplifier is provided between the laser and four wave mixer to transfer energy from the input beam to the seed beam and thereby amplify the seed beam to produce a phase conjugated output beam with approximately 50% of the energy of the input beam and narrow bandwidth which is free from random phase jumps associated with the acoustic noise generally required to initiate and sustain stimulated Brillouin scattering. The phase conjugated output beam can be modulated or steered in direction, as desired. Reference beams for the four wave mixer may be derived from the same laser source as the input beam and have energies one or more orders of magnitude smaller than the energy of the input beam.

19 Claims, 5 Drawing Sheets

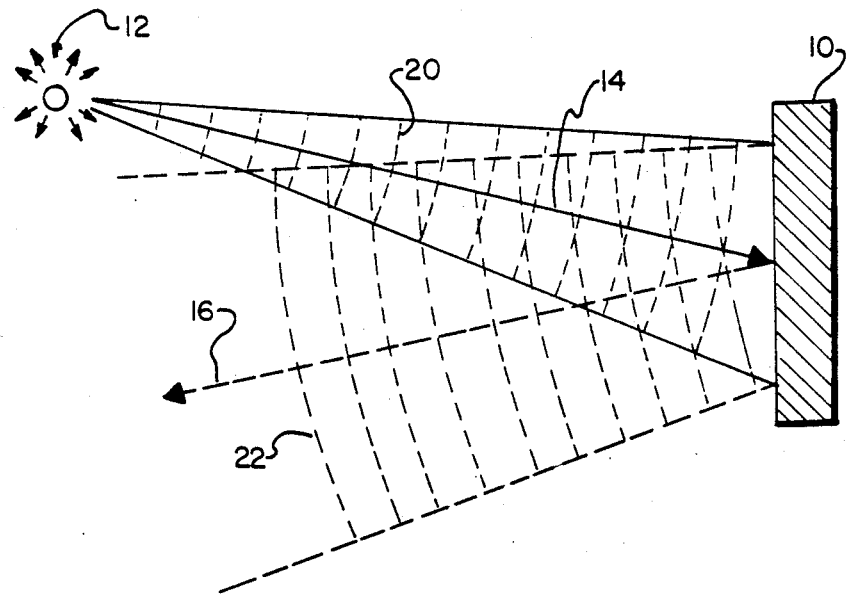
Fig.1.a. (PRIOR ART)
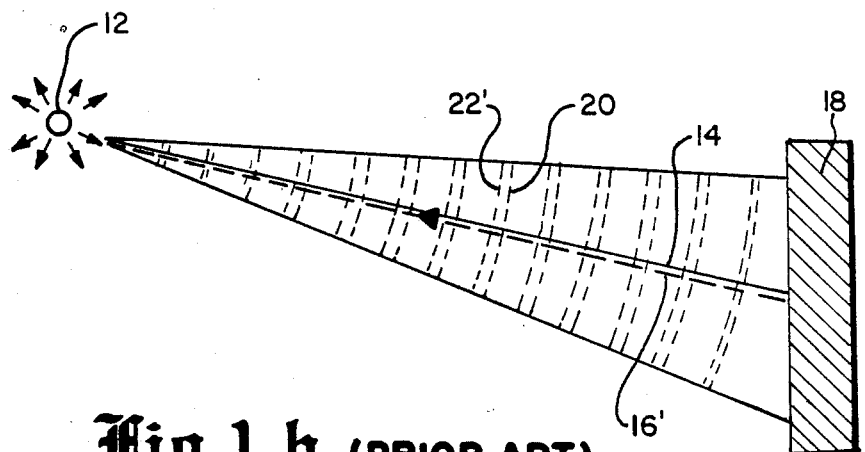
Fig.1.b. (PRIOR ART)

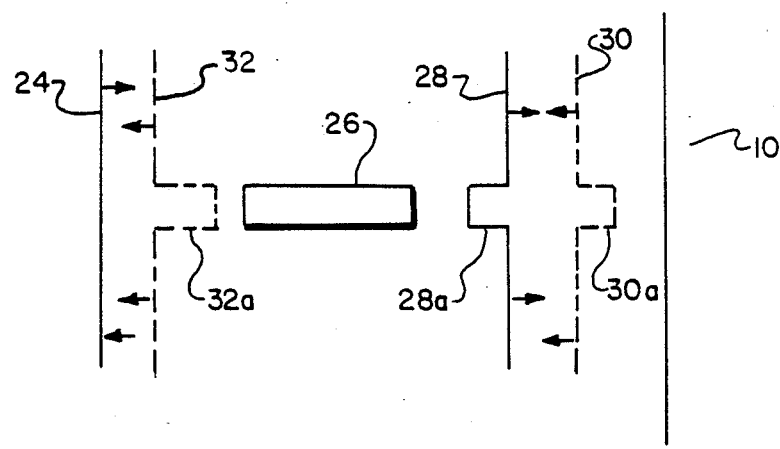
Fig.2.a. (PRIOR ART)
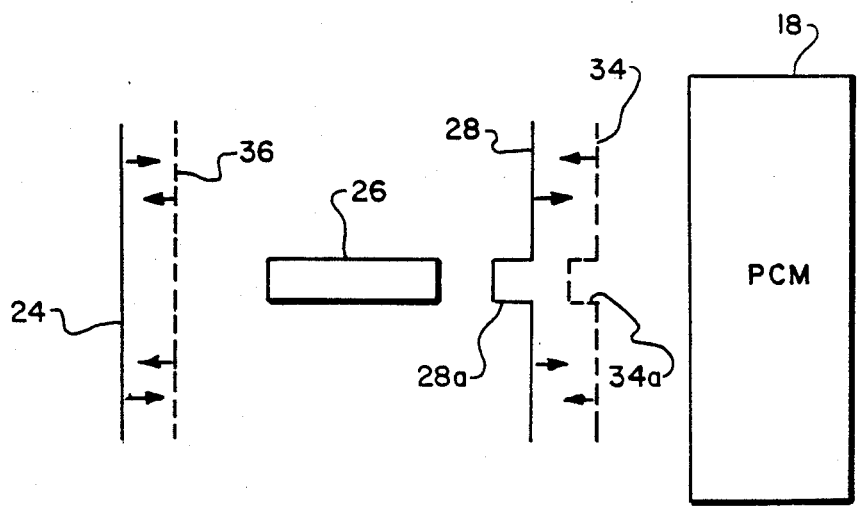
Fig.2.b. (PRIOR ART)

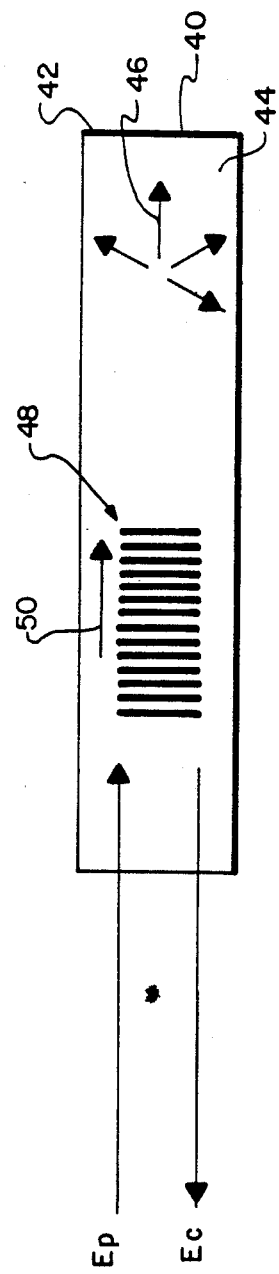
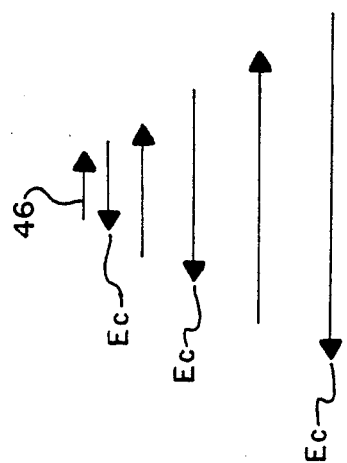
Fig. 3.a. (PRIOR ART)
Fig. 3.b. (PRIOR ART)

BANDWIDTH-PRESERVING BRILLOUIN PHASE CONJUGATE MIRROR AND METHOD

BACKGROUND OF THE INVENTION

1. Field of the Invention

The present invention generally relates to the field of nonlinear optical phase conjugation, and more specifically to a phase conjugate mirror utilizing a novel and unique combination of Stimulated Brillouin Scattering (SBS) in an amplification regime and Four Wave Mixing (FWM) to realize an efficiency of at least 50% in producing a high energy, phase conjugate reflection with low spectral bandwidth.

2. Description of the Related Art

Nonlinear Optical Phase Conjugation (NOPC) involves the real-time spatial and/or temporal information processing of electromagnetic fields using Nonlinear Optical (NLO) techniques. Although the field has evolved to encompass a remarkably rich and diverse set of applications including nonlinear laser spectroscopy, the major thrust of NOPC lies in the area of real-time compensation of distortions encountered in electromagnetic fields due to propagation and/or transmission through various aberrating media.

A Phase Conjugate Mirror (PCM) produces a retro-reflection of an incident beam. The unique properties of phase conjugate reflection are illustrated in FIGS. 1a and 1b. FIG. 1a shows the case of a conventional plane mirror 10 illuminated by a monochromatic point light source 12. The mirror 10 merely changes the propagation direction of a diverging incident beam 14 shown in solid line to that of a reflected beam 16 shown in broken line in such a manner that the angles (not designated) of incidence and reflection are equal.

FIG. 1b illustrates the case of a phase conjugate mirror 18 which reflects the incident beam 14 in such a manner that a reflected beam 16' exactly retraces the incident beam 14 in a "time-reversed" sense. Wavefronts 22' of the reflected beam 16', shown in broken line, overlap wavefronts 20 of the incident beam 14, although shown as displaced in the drawing for illustrative purposes.

It will be noticed in FIG. 1a that the wavefronts 20 of the incident beam 14 appear concave as viewed from the source 12, whereas wavefronts 22 of the reflected beam 16 appear convex as viewed from the source 12. In FIG. 1b, both wavefronts 20 and 22' appear concave as viewed from the source 12. Due to this reversal of the phase of the wavefronts, the phenomenon is referred to as wave-front reversal (WFR) in Soviet literature.

The phase reversal effect is further illustrated in FIGS. 2a and 2b. In FIG. 2a, a planar wavefront 24 of a coherent light beam is passed through a distortion element such as a glass cylinder 26 which introduces a "bulge" 28a in a wavefront 28 of the beam during propagation through the cylinder 26. Reflection of the wavefront 28 from the plane mirror 10 produces a wavefront 30 having a bulge 30a which lags the remainder of the wavefront 30 in phase. Propagation of the wavefront 30 back through the cylinder 26 produces a wavefront 32 having a bulge 32a which is double the size of the bulges 28a and 30a. Where the cylinder 26 is replaced by a transmission medium such as the atmosphere in an aerospace application or by an amplifier, the effect is especially undesirable. Any distortion introduced by an intervening medium or amplifier is doubled during two passes therethrough.

The phase conjugate mirror 18 illustrated in FIG. 2b has the highly desirable property of reversing and thereby eliminating any distortion introduced by a medium represented by the cylinder 26. Propagation of the wavefront 24 through the cylinder 26 produces the distorted wavefront 28 as in FIG. 2a. However, the phase of a wavefront 34 reflected by the phase conjugate mirror 18 is reversed with reference to the incident wavefront 28 in that a bulge 34a leads the remainder of the wavefront 34 in phase in a manner opposite to that of the wavefront 30 shown in FIG. 2a. Propagation of the wavefront 34 through the cylinder 26 produces a wavefront 36 which is planar (equiphase), since a lagging bulge (not shown) introduced by the cylinder 26 cancels the leading bulge 34a of the wavefront 34. It is this property of phase conjugate reflection which is so desirable since it enables propagation through and amplification by intervening media without distortion thereby.

Two widely used methods for producing optical phase conjugation are Stimulated Brillouin Scattering and Four Wave Mixing (FWM). Phase conjugation by stimulated Brillouin scattering was first recognized by researchers at the Lebedev Physical Institute in Moscow in 1972, as documented in Zel'dovich, B. Ya et al, Pis'ma Zh. Eksp. Teor. Fiz. Pisma 15, 160 [JETP Lett. (Engl. Transl.) 15, 109](1972). A general introduction to the principles of optical phase conjugation is found in "Optical Phase Conjugation", by Vladimir V. Shkunov and Boris Ya. Zel'dovich, Scientific American, Dec. 1985, pp. 54–59. An introduction to practical application of optical phase conjugation including detailed presentations of stimulated Brillouin scattering and four wave mixing is found in "Applications of Optical Phase Conjugation", by David M. Pepper (one of the present inventors), Scientific American, Jan. 1986, pp. 74–83. A detailed treatise on the optical, physical and mathematical principles of optical phase conjugation is found in "Non-Linear Optical Phase Conjugation", by David M. Pepper, Laser Handbook Vol. 4, Elsevier Science Publishers BV, North-Holland Physics Publishing, Amsterdam, 1985. A basic reference to Brillouin-enhanced four-wave mixing, the specific type of four wave mixing relevant to this invention, is found in a paper entitled "Wave-front inversion of weak optical signals with a large reflection coefficient", by N. F. Andreev et al, JETP Lett. Vol. 32, No. 11, 5 Dec. 1980, pp. 625-629. This reference also teaches how all of the interacting beams required in the four wave mixing process may be derived from a single coherent laser source by means of beam splitting.

Laser radar is of increasing importance in a number of modern military applications such as missile guidance, terrain following and obstruction avoidance, global atmospheric measurements and as elements in Strategic Defense Initiative (SDI) systems. Present laser radar concepts exclusively employ $CO_2$ lasers, which are limited in lifetime (particularly in space-based scenarios).

There is a need for a narrow bandwidth, high power laser source for laser radar applications. Various limitations have heretofore precluded the use of phase conjugate mirrors in applications including laser radar which require narrow source bandwidths of approximately 10 KHz to 1 MHz. The spectral bandwidth of a conjugate beam produced by a basic (SBS) phase conjugate mirror can be no less than approximately one-tenth of the Brillouin gain linewidth. This minimum spectral bandwidth limit results from the phase jumps introduced by the random nature of the acoustic noise that creates and sustains the Brillouin process. Typical Brillouin linewidths range from approximately 5 MHz to 300 MHz for a pump laser wavelength of one micrometer. Four wave mixing eliminates the phase jumps and enables narrow linewidths, but requires auxiliary coherent light sources to produce the reference means which must be more powerful than the beam being conjugated and of nearly diffraction-limited optical quality, thereby greatly increasing the cost and complexity of the apparatus. In principle, one can realize a high-energy, narrow modulation linewidth optical system in several ways. First, the output of a high-energy laser can be directly modulated with a narrow linewidth modulator. This scheme is undesirable since the modulator must be placed in the high-energy output leg of the system and must therefore be resilient in terms of laser damage, stress-induced birefringence, and other mechanical and thermal perturbations. All of these problems can degrade the performance of the system by introducing phase aberrations and imposing various deleterious nonlinear optical distortions onto the output beam. Another approach is to modulate a narrowband, low-energy oscillator, which then drives a laser amplifier chain. This scheme also has drawbacks: even though the modulator is in a low-energy leg of the system, the final high-energy output can be distorted by the amplifier(s) themselves. Distortions such as stress-induced birefringence, thermal, mechanical, beam wander, etc. can be imposed onto a laser beam as it traverses a series of amplifiers.

SUMMARY OF THE INVENTION

In accordance with the present invention, a coherent input beam from a laser is fed into a Brillouin-enhanced four wave mixer which generates a phase conjugated seed beam in counterpropagation with the input beam. A Brillouin amplifier is provided between the laser and four wave mixer to transfer energy from the input beam to the seed beam and thereby amplify the seed beam to produce a phase conjugated output beam with approximately 50% of the energy of the input beam and narrow bandwidth which is free from random phase jumps associated with the acoustic noise generally required to initiate and sustain stimulated Brillouin scattering. Reference beams for the four wave mixer may be derived from the same laser source as the input beam. Moreover, because the phase conjugated seed beam produced by the four wave mixer need have only approximately one to ten percent of the energy of the initial input beam, the reference beam can have energies one or more orders of magnitude smaller than the energy of the input beam.

The present invention opens the possibility of employing higher reliability, higher energy-scalable phase conjugate solid-state and semiconductor diode lasers in applications including laser radar which require narrow source bandwidths.

In the present invention, the narrowband modulation is imposed onto a low-energy leg of the system. Furthermore, the use of a phase-conjugator, in conjunction with the double-pass geometry compensates for amplifier distortions and, at the same time, more efficiently extracts the stored energy in the amplifiers as useful, diffraction-limited output light. Furthermore, the phase-conjugate technique can be used to extract the stored energy in a coherent manner from a set of parallel as well as series chains of laser amplifiers, or combinations thereof.

It is a purpose of the present invention to provide a bandwidth-preserving Brillouin phase-conjugate mirror having a phase-conjugate reflectivity on the order of 50% and which produces a phase conjugate reflected beam with a linewidth which is not significantly larger than that of an input probe beam.

It is another purpose of the present invention to provide a bandwidth-preserving Brillouin phase-conjugate mirror which is applicable to laser radar applications and which is scalable to higher energy levels utilizing a plurality of parallel beams.

It is another purpose of the present invention to provide a bandwidth-preserving Brillouin phase-conjugate mirror which is free from any dependence on spontaneous acoustic noise sources and thereby of random phase jumps and accompanying increases in bandwidth and which requires only a single coherent light source and reference beams which may be several orders of magnitude weaker than the input probe beam.

It is yet another purpose of the present invention to provide a bandwidth-preserving Brillouin phase-conjugate mirror which enables modulation of the phase conjugate beam in a low power portion of the apparatus.

It is yet another advantage of the present invention that the mirror can precisely steer the phase conjugate beam by tilting one of the reference beams employed in the phase conjugate mirror.

These and other features and advantages of the present invention will be apparent to those skilled in the art from the following detailed description of a preferred embodiment, taken together with the accompanying drawings, in which like reference numerals refer to like parts.

BRIEF DESCRIPTION OF THE DRAWING

FIGS. 1a and 1b are diagrams illustrating basic properties of optical phase conjugation;

FIGS. 2a and 2b are diagrams illustrating elimination of wavefront aberrations by means of phase conjugation;

FIGS. 3a and 3b are diagrams illustrating a basic stimulated Brillouin scattering process;

DESCRIPTION OF THE PREFERRED EMBODIMENT

Figure 5:
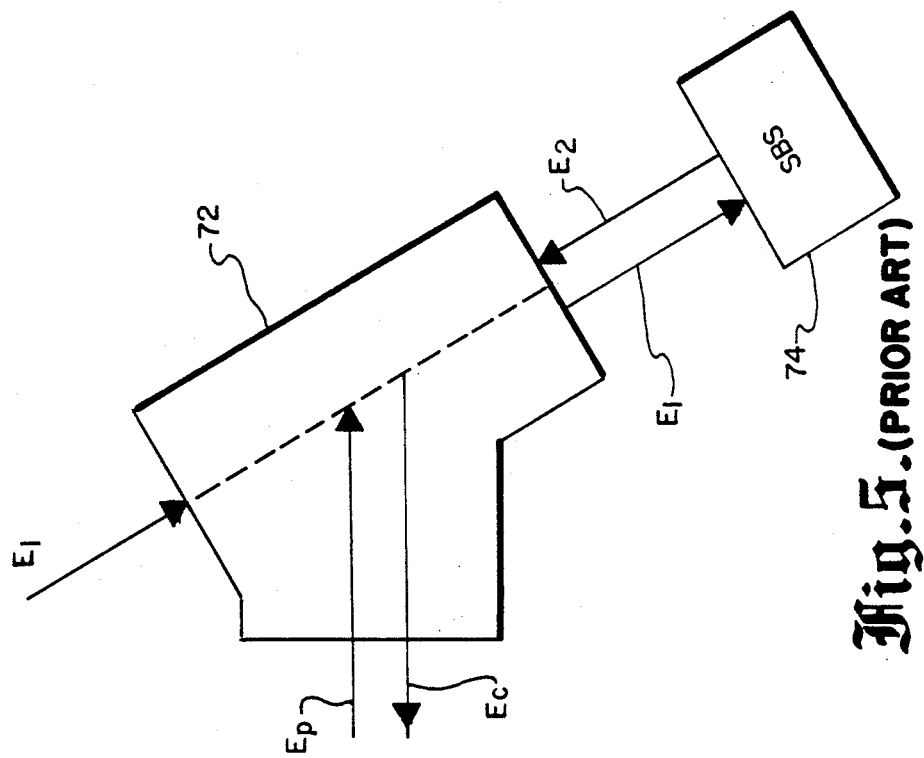
FIG. 5 is a block diagram illustrating a prior art hybrid stimulated Brillouin scattering/four wave mixing process.

As illustrated in FIGS. 3a and 3b, a phase conjugate mirror 40 based on stimulated Brillouin scattering has the advantage of comprising only a container 42 filled with an appropriate nonlinear medium 44. A conjugate reflected seed beam $E_c$ is produced by scattering of an input or pump or probe beam $E_p$ from a periodic pattern of "gratings" 48 in the form of sonic wavefronts which propagate through the medium 44 in the direction of movement 50 of the input beam $E_p$ at the local speed of sound in the medium 44. The gratings 48 are generated in response to progressive reinforcement of properly aligned thermal noise phonon waves 46 through interaction with the input beam $E_p$. As best seen in FIG. 3b, the properly aligned phonon waves 46 progressively increase in amplitude through interaction with the input beam $E_p$ and overwhelm all other random noise phonon waves which naturally exist in the medium 44. The conjugate reflected beam $E_c$ is downshifted relative to the input beam $E_p$ by a frequency shift $\nu_b$ which is variously referred to in the literature as the Stokes or Brillouin shift, and is produced by a Doppler effect induced by the moving gratings 48.

However, the process is subject to a major drawback which has immediate relevance to the present invention. Due to the fact that thermal noise is required for initiation, the absolute phase of the conjugate wave is uncertain, and, moreover, the phase of the conjugate wave may undergo discrete "jumps" during the evolution of the SBS process. The uncertainly in the absolute phase is generally of little practical consequence. However, the existence of "phase jumps" may severely limit the usefulness of stimulated Brillouin scattering in certain practical applications. A detailed presentation of this phenomenon is found in Basov, N. G. et al, Zh. Eksp. Teor. Fiz. Pis'ma 31, 685 [JETP Lett. 31, 645](1980).

Figure 4:
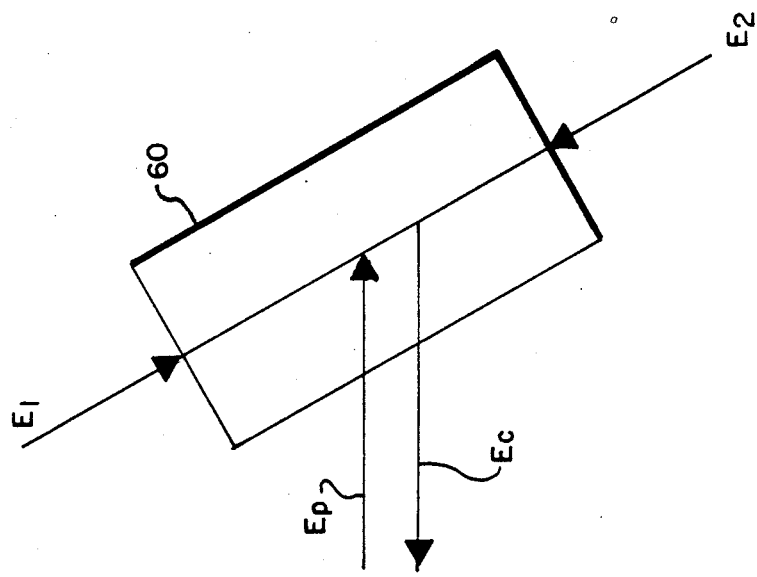
FIG. 4 is a block diagram illustrating a basic four wave mixing process.

The basic four wave mixing process is illustrated in FIG. 4 and comprises a cell 60 containing an appropriate non-linear material or medium. A probe beam $E_p$, which corresponds directly to the counterpart pump beam illustrated in FIGS. 3a and 3b, is directed into the cell 60. A phase conjugated Stokes beam $E_c$ is reflected from the cell 60 in counter propagation with the beam $E_p$.

Contradirectional pump or reference beams $E_1$ and $E_2$ are directed into the cell 60 as illustrated. The reference beams $E_1$ and $E_2$ are generated by one or two external lasers (not shown). Depending on the specific type of four wave mixing employed, the frequencies of the three beams $E_1$, $E_2$, and $E_p$ may all be the same, or they may differ from one another. For the present invention the frequencies of $E_1$ and $E_p$ are the same, while the frequency of $E_2$ is lower by an amount equal to the Stokes or Brillouin shift. Assuming the frequencies have been correctly selected, the three input beams interact in the cell 60 to form interference patterns in space and/or time which result in the generation of the phase conjugated beam $E_c$.

The four wave mixer overcomes the disadvantage inherent in stimulated Brillouin scattering as discussed hereinabove. The interference patterns or gratings which are generated in the cell by the interfering light beams are orders of magnitude greater in intensity than the thermal noise that initiates and sustains the stimulated Brillouin scattering process. Therefore, the phase jumps are eliminated. However, the basic four wave mixing process suffers from the disadvantage that two additional coherent light sources are required, which have heretofore had to produce reference beams $E_1$ and $E_2$ which were more powerful than the probe beam $E_p$ by a large extent.

A partial solution to the problems which have existed heretofore, constituting the closest prior art known to the present inventors, is illustrated in FIG. 5. The process is disclosed in "Investigation of a Hypersonic Wavefront-Reversing Mirror Operating in a Master-Oscillator-Amplifier Configuration", by N. G. Basov et al, Sov. J. Quantum Electron, 16 (6), June 1986. In this arrangement, two SBS cells 72 and 74 are used (each with the same nonlinear medium such as carbon tetrachloride), and an efficient phase-conjugate reflection of a probe beam $E_p$ results from a sequence of three steps:

(1) generation of counterpropagating reference beams,
(2) creation of a weak conjugate seed, and
(3) SBS amplification of the conjugate seed.

A reference beam $E_1$ is generated either by splitting off a portion of $E_p$, or by employing a separate source (not shown) and directed into the cell 72 as illustrated. The beam $E_1$ traverses the cell 72 and passes therefrom into a stimulated Brillouin scattering (SBS) cell 74 which produces a second reference beam $E_2$ as a conjugate reflection of the beam $E_1$. The beam $E_2$ is perfectly counterpropagating with respect to the beam $E_1$ due to the effect illustrated with reference to FIGS. 1 and 2 and is downshifted in frequency by the Stokes or Brillouin shift $\nu_b$. Following the creation of the reference beam $E_2$, a situation exists in which both $E_1$ and $E_2$ coexist in 72. The optical arrangement is such that the probe beam $E_p$ is aligned to overlap the reference beams $E_1$ and $E_2$ in cell 72. By virtue of a process called Brillouin-enhanced four-wave mixing (BEFWM), a conjugate seed wave $E_c$ is generated for the probe beam, and this conjugate seed is downshifted in frequency relative to reference beam $E_1$ by the same Stokes or Brillouin shift $\nu_b$. A review of BEFWM has been written by A. M. Scott and K. D. Ridley; it will appear in the Mar., 1989 issue of the IEEE Journal of Quantum Electronics.

In previous applications of BEFWM as in the above discussion of ordinary FWM, the reference waves were typically much more energetic than the signal, resulting in the conjugate also being more energetic than the signal. In the present application the opposite is true. The reference waves are typically weaker than the probe beam (by a factor of approximately 10), as is the initial conjugate seed wave produced by the BEFWM interaction. However, because of the Brillouin frequency shift imposed on the conjugate seed by the BEFWM process, if the Brillouin medium extends sufficiently far along the direction of the incoming probe beam, efficient Brillouin amplification of the conjugate seed wave can occur at the expense of the incoming probe beam (this process is entirely analogous to backward-Raman amplification of a weak seed beam).

In one embodiment demonstrated by Basov et al, the reflection coefficient of the conjugate beam $E_c$ relative to the probe beam $E_p$ is on the order of 20%. However, as they further show, the coefficient can be increased to the order of 50% through partial decoupling of the reference beam $E_2$ and the probe $E_p$ by changing their relative polarization or separating the interaction and amplification regions of the four beams in the cell 72 in the manner disclosed in the reference.

The configuration illustrated in FIG. 5 provides an acceptable conjugate reflection efficiency on the order of 50% and enables the reference beams to be lower in energy than the probe beam. However, this prior art expedient still suffers from the spectral broadening problem inherent in stimulated Brillouin scattering since the reference beam $E_2$ is produced in the SBS cell 74 through the basic SBS process with the accompanying random acoustic noise factor. In general, any process involving the generation of a beam in an SBS cell will destroy the narrow-band nature of the configuration.

Figure 6:
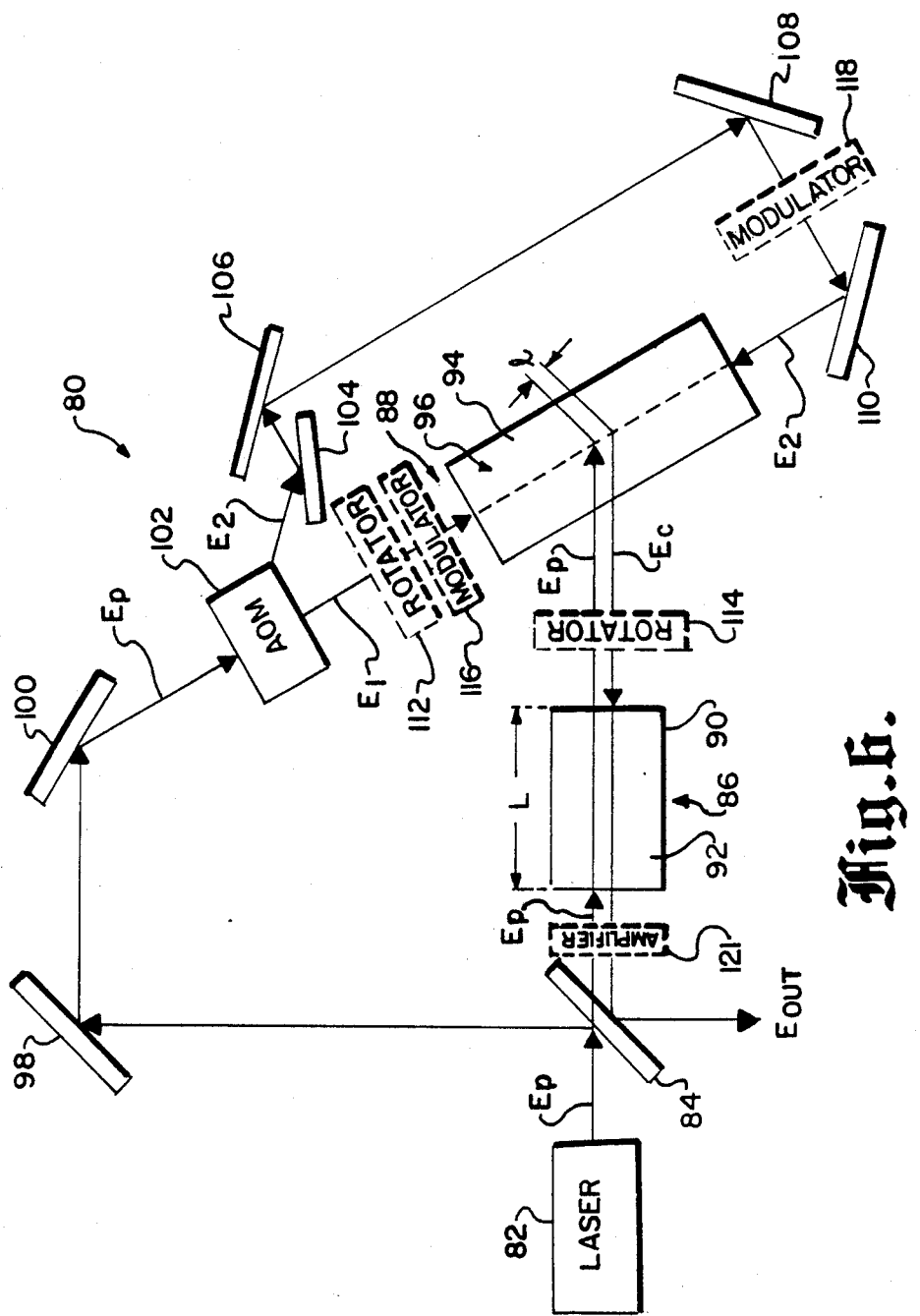
FIG. 6 is a block diagram of a bandwidth-preserving Brillouin phase-conjugate mirror in accordance with the present invention.

Referring now to FIG. 6, a bandwidth-preserving Brillouin phase-conjugate mirror in accordance with the present invention is generally designated by the reference numeral 80 and comprises a source for producing a diffraction-limited, narrow-bandwidth beam with similar characteristics as a laser 82. The laser 82 is preferably of the solid-state or semiconductor diode type, but may be of any type which fulfills the necessary requirements for power, frequency and linewidth. FIG. 6 also indicates a typical application of this invention in conjunction with a laser amplifier 121, resulting in the conjugate beam being intensified relative to the initial beam. The intensified output beam is denoted $E_{out}$. The amplifier 121 can be a single component, a group of amplifiers in series, a group of amplifiers in parallel, or any combination thereof. Approaches for deflecting the output beam $E_{out}$ away from the laser 82 are well known in the art. Such approaches often employ polarizing beam splitters and means for polarizing $E_{out}$ orthogonal to $E_p$. However, it is to be understood that the present invention can be used for other applications without a laser amplifier.

The laser 82 generates a beam $E_p$ which is the equivalent of the probe beams discussed hereinabove. However, it is split and frequency shifted in a manner which will be described in detail hereinbelow to further constitute a single source for the reference beams required in the four wave mixing process.

A component of the beam $E_p$ which constitutes an input beam moves rightwardly as viewed in the drawing from the laser 82 through a beam-splitting mirror 84 and Brillouin amplifier cell 86 into a Brillouin enhanced four wave mixing cell 88. The cells 86 and 88 are similar to those discussed hereinabove with reference to the prior art, and comprise light pipes or other appropriate containers 90 and 94 which are filled with nonlinear media or materials 92 and 96 respectively. The nonlinear media 92 and 96 may be in the form of a semiconductor, crystal, liquid, gas, plasma, liquid crystal, aerosol or atomic vapor. Typically, the nonlinear media 92 and 96 may comprise a gas such as $N_2$, Xe, $CH_4$ or $SF_6$.

Another component of the beam $E_p$ from the laser 82 is reflected from the beam-splitting mirror 84 and directed via plane reflecting mirrors 98 and 100 into an acoustooptic modulator (AOM) 102. A component of the beam $E_p$ passes straight through the acousto-optic modulator 102 and constitutes a reference beam $E_1$ which is directed into the mixing cell 88. A second component of the beam $E_p$ is deflected by the acousto-optic modulator 102 toward a plane reflecting mirror 104. The second component is frequency downshifted by the AOM 102 by an amount equal to the Stokes or Brillouin frequency $\nu_b$ of the material in the cells 86 and 88 to constitute the second reference beam $E_2$. It will be noted that where the output frequency of the beam $E_p$ as generated by the laser 82 is $\nu_0$, the frequency of the reference beam $E_1$ is also $\nu_0$ and the frequency of the reference beam $E_2$ as downshifted by the Stokes frequency $\nu_b$ is $\nu_0-\nu_b$.

The acousto-optic modulator 102 per se is a well known and conventional element in the art of laser optics, and may comprise a crystal in combination with an acoustic transducer, although not illustrated. If desired, the acousto-optic modulator 102 may be replaced by any known equivalent single-sideband modulator.

The deflected and frequency-downshifted beam $E_2$ is reflected from the mirror 104 and plane reflecting mirrors 106, 108 and 110 into the four wave mixing cell 88 so as to be counterpropagating with the beam $E_1$. The properties of the beam-splitting mirror 84 and acousto-optic modulator 102 are selected in such a manner that the energies of reference beams $E_1$ and $E_2$ are substantially lower than that of the component of the probe beam $E_p$ which enters the Brillouin cell 86. Typically, the reference beams will be one or two orders of magnitude (10 to 100 times) weaker than the probe beam. This feature is one of the major advantages of the present invention. Not only can the interference patterns in the mixing cell 88 be generated using low power reference beams, but all beams required by the present process may be derived from a single source. However, in other embodiments of the present invention, multiple sources could be used to generate the required probe and reference beams. In such cases, the frequencies of the multiple sources should be locked to a common standard.

The four wave mixing process that occurs in the mixing cell 88 is similar to that described hereinabove with reference to FIG. 4, producing a reflected output phase conjugate seed beam $E_c$. Due to the fact that the frequency of the beam $E_2$ is downshifted from that of the beam $E_p$ by the Stokes frequency $\nu_b$, scattering of the reference beam $E_1$ from the grating generated by interference of the beams $E_p$ and $E_2$ produces $E_c$ at a frequency downshifted from that of the reference beam $E_1$ by the Brillouin shift or $\nu_0-\nu_b$.

The conjugate seed beam $E_c$ emerging from the mixing cell 88 passes into the Brillouin amplifier cell 86 in counterpropagation with the input probe beam $E_p$. The Stokes frequency shift between the coexisting beams $E_p$ and $E_c$ in the cell 86 enables coupling therebetween and Brillouin amplification of the conjugate beam $E_c$ at the expense of the probe beam $E_p$. The conjugate beam $E_c$ is further amplified in laser amplifier 121, after which it is reflected downwardly as viewed in the drawing by the mirror 84 to constitute an output beam $E_{out}$ of the present bandwidth-preserving Brillouin phase-conjugate mirror 80. As will become clear from the following mathematical analysis of the interaction processes, the Brillouin amplification occurring in the cell 86 enables the present bandwidth-preserving Brillouin phase-conjugate mirror 80 to attain an overall conjugate reflection coefficient on the order of 50% at highly useful energy levels, a figure which is fully acceptable for practical applications in laser radar.

Assume that the intensities of the reference beams $E_1$ and $E_2$ as the beams enter the cell 88 are designated as $I_1$ and $I_2$ respectively, with the frequency of the beam $E_2$ downshifted by the Stokes frequency $\nu_b$ relative to $E_1$, and that the intensity of the probe beam $E_p$ as it enters the cell 88 is designated as $I_p$. Further assuming no depletion of $I_1$ and $I_p$, the intensity $I_c$ of the Stokes-shifted conjugate beam $E_c$ is given by the following equation (1):

$$I_c = I_2/4 \times \exp[g(I_1+I_p-(I_1I_p)^{\frac{1}{2}})l] \times [\exp(g(I_1I_p)^{1/2}l)-1]^2 \quad (1)$$

where g is the Brillouin gain coefficient and l is the interaction length in the mixing cell 88. For the present concept to be practical, the sum $(I_1+I_2)$ must be small compared to $I_p$. Assuming that said sum is 10% of $I_p$, and further assuming that $I_1=I_2$, equation (1) predicts that $I_c/I_p$ will be approximately 10% for $gI_pl=3$. This value for the conjugate seed should be sufficient to effectively saturate the backward-Brillouin amplifier 86 pumped by the incoming $I_p$. Based on the present inventors' experience with Raman amplifiers, it is to be expected that the Brillouin amplifier 86 would require a $gI_pL$ of approximately 5–6, where L is the interaction length of the amplifier 86. Where the Brillouin medium 92 and 96 in the cells 86 and 88 is methane (g=70 cm/GW at 105 atmospheres pressure) and the interaction length l is 10 cm, a $gI_pl$ value of 3 results from an intensity of only approximately 4.3 MW/cm². The same intensity and a longer interaction length L of 20 cm would produce an adequate $gI_pL$ value for the Brillouin amplifier 86.

Because the beam $E_2$ is downshifted relative to $E_1$ by the Brillouin frequency $\nu_b$, the two reference beams can interact in the mixing cell 88 to form an acoustic grating that diffracts a portion of $I_p$ into the direction of $I_2$. In addition, $I_2$ can also experience direct Brillouin amplification by $I_1$, thereby scattering a portion of $I_1$ into the direction of $I_2$. Both of these processes are included in the analysis that leads to equation (1). It is not obvious that these interactions would interfere with the successful performance of the present invention. However, in the event that they do, the interactions between the reference beams $E_1$ and $E_2$ can optionally be eliminated by rotating the polarization of the beam $E_1$ by 90° utilizing a conventional Faraday rotator 112 or other polarization rotation device illustrated in broken line before it enters the mixing cell 88. In this case a compensating Faraday rotator 114 illustrated in broken line would be provided between the cells 86 and 88 to rotate the polarization of the conjugate beam $E_c$ in such a manner as to coincide with that of the probe beam $E_p$ inside the Brillouin amplifier. A detailed treatise on decoupling of probe and reference beams in a four wave mixer is presented in a paper entitled "Polarization methods for improvement of the energy characteristics of wavefront-reversing mirrors", by V. F. Efimkov et al, Sov. J. Quantum Electron. 14 (2), Feb. 1984, pp. 209–213.

The present configuration also enables modulation or chirping (frequency sweeping) of the conjugate beam within the limits of the Brillouin gain linewidth, as may be required in typical applications. The modulation may be applied to the reference beam $E_1$ by a separate modulator 116 in the optical path between the acousto-optic modulator 102 and the mixing cell 88. It is further possible to modulate the reference beam $E_2$ by providing an optional modulator 118 in the optical path between the acousto-optic modulator 102 and the mixing cell 88. In general, modulation may be feasibly introduced at any low power point in the optical path of the laser beam, thereby minimizing problems associated with power loading. Efficient operation of the mixer 88 requires that the frequency of the beam $E_2$ be less than that of beam $E_p$ by an amount equal to Stokes frequency shift of the mixer medium 96. Similarly, efficient operation of the Brillouin amplifier, 86, requires that the frequency of the beam $E_c$ be less than that of beam $E_p$ by an amount equal to Stokes frequency shift of the amplifier medium 92. For a given frequency of beam $E_p$ and an arbitrary modulation bandwidth and format imposed onto the conjugate seed beam, $E_c$, via modulators 116 and/or 118, the above conditions can be satisfied by employing any one of several methods. Representative examples of such methods include: (1) adjusting the composition of medium 92 and/or 94; (2) changing the frequency of AOM 102 to compensate the frequency offset applied by modulator 118; or (3) imposing a constant frequency offset on modulators 116 and/or 118.

The present configuration also enables one to steer the conjugate beam slightly relative to the exact opposite direction of the probe beam $E_p$. While such beam steering might sacrifice some of the benefits of phase conjugation, it may be useful in applications in which one desires the conjugate beam to point ahead of the direction of the probe beam when the probe beam is generated by a moving source (a satellite, for example). The beam steering is accomplished by tilting slightly either of the reference beams $E_1$ and $E_2$ such that they are not exactly counterpropagating.

It will be fully appreciated by those skilled in the art that the acousto-optic modulator 102 or equivalent device which produces the reference beam $E_2$ at a frequency which is downshifted by the Stokes or Brillouin frequency relative to the reference beam $E_1$ produces the desired result without increasing the bandwidth of the conjugate reflected beam $E_c$ as does the SBS cell 74 in the prior art configuration of FIG. 5. This is because the acousto-optic modulator 102 does not produce phase jumps of the type which result from thermal noise in an SBS cell. In fact, the frequency stability of a typical AOM can be as small as a few Hz, a value of negligible consequence in anticipated laser radar systems. Therefore, the bandwidth of the reflected conjugate beam $E_c$ is essentially the same as that of the probe and reference beams $E_p$, $E_1$ and $E_2$ respectively, and the bandwidth of the present phase conjugate mirror is limited only by the bandwidth of the laser beams which are applied thereto. Thus, the present invention enables faithful conjugate reflection of a very narrow bandwidth laser beam, enabling the heretofore unattainable construction of a narrow bandwidth, high power laser source which is directly applicable to a laser radar system.

In summary, it will be seen that the bandwidth-preserving Brillouin phase-conjugate mirror embodying the present invention overcomes the drawbacks of the prior art in a novel and unique manner, enabling high energy output, conjugate reflectivity of at least 50%, narrow bandwidth for laser radar and other applications, and simplicity of design requiring only a single laser source.

Although the present invention has been described in detail with reference to a particular preferred embodiment, persons possessing ordinary skill in the art to which this invention relates will appreciate that various modifications may be made without departing from the scope and spirit of the invention. It is intended, therefore, that the invention not be limited solely to the described embodiments. For example, the single channel laser and Brillouin cell arrangement described hereinabove may be replaced by a configuration of multiple channels, thereby enabling energy scaling to a great extent.

Various modifications are contemplated and can be made without departing from the spirit and scope of the invention as hereafter defined by the appended claims.

We claim:

1. A method of generating a narrow bandwidth output optical beam as a phase conjugated reflection of a narrow bandwidth input optical beam, comprising the steps of:
   (a) splitting a narrow bandwidth coherent optical beam from a laser source into a first component constituting the input beam and second and third components constituting first and second reference beams respectively;
   (b) applying the input beam through a Brillouin amplifier to a four wave mixer, which includes a nonlinear medium, to generate a phase conjugated optical seed beam in counterpropagation with the input beam;

(c) downshifting the frequency while preserving the narrow bandwidth of either the first or second reference beam by a Stokes frequency of the nonlinear medium in the four wave mixer;

(d) directing the first and second reference beams into the four wave mixer in counterpropagation with each other; and (e) applying the seed beam to the Brillouin amplifier to transfer energy from the input beam to the seed beam and thereby amplify the seed beam to constitute the output beam.

2. A method as in claim 1, in which the splitting of step (a) is performed in such a manner that the intensities of the first and second reference beams are lower than the intensity of the input beam.

3. A method as in claim 1, in which reflection by plane mirrors is used for directing the first and second reference beams as recited in step (d).

4. A method as in claim 1, further comprising the step performed between steps (c) and (d), of:

rotating a polarization of either one of the first or second reference beams.

5. A method as in claim 4, further comprising the step, performed before step (e), of:

rotating a polarization of the seed beam to coincide with a polarization of the input beam.

6. A method as in claim 1, further comprising the step of:

applying modulation to at least one of the first and second reference beams.

7. A method as in claim 1, further comprising the step of:

applying modulation to at least one of the input and seed beams.

8. An optical phase conjugate mirror for generating a narrow bandwidth output optical beam as a phase conjugated reflection of a narrow bandwidth input optical beam, comprising:

four wave mixer means for generating a phase conjugated optical seed beam in substantial counterpropagation with the input beam;

Brillouin amplifier means disposed in an optical path of the input and seed beams for transferring energy from the input beam to the seed beam and thereby amplifying the seed beam to constitute the output beam;

beam splitting means for splitting a narrow bandwidth coherent optical beam from a laser source into a first component constituting the input beam and second and third components constituting first and second reference beams respectively; and beam director means for directing the first and second reference beams into the four wave mixer means in substantial counterpropagation with each other;

the Brillouin amplifier means comprising a nonlinear medium, the beam splitting means comprising frequency shifting means for downshifting a frequency while preserving the narrow bandwidth of one of the first and second reference beams by a Stokes frequency of the nonlinear medium.

9. An optical phase conjugate mirror as in claim 8, in which the first and second reference beams and the input beam each have one respective intensity, the beam splitting means being constructed to split the coherent beam from the laser source in such a manner that the intensities of the first and second reference beams are smaller than the intensity of the input beam.

10. An optical phase conjugate mirror as in claim 8, in which the beam director means comprises at least one plane mirror.

11. An optical phase conjugate mirror as in claim 8, in which the frequency shifting means comprises modulator means.

12. An optical phase conjugate mirror as in claim 11, in which the modulator means comprises an acousto-optic modulator.

13. An optical phase conjugate mirror as in claim 8, in which the beam splitting means comprises polarization rotating means for rotating a polarization of one of the first and second reference beams.

14. An optical phase conjugate mirror as in claim 13, in which the polarization rotating means further comprises means for rotating a polarization of the seed beam to coincide with a polarization of the input beam.

15. An optical phase conjugate mirror as in claim 8, further comprising modulation means for modulating at least one of the input beam, seed beam, first reference beam and second reference beam.

16. An optical phase conjugate mirror as in claim 8, in which the four wave mixing means comprises a nonlinear medium.

17. An optical phase conjugate mirror as in claim 8, further comprising said laser source.

18. An optical phase conjugate mirror as in claim 8, further comprising amplifier means disposed between the laser source and the Brillouin amplifier means for amplifying the input beam and the output beam.

19. An optical phase conjugate mirror as in claim 8, in which the beam director means comprises beam steering means for slightly tilting an axis of one of the first and second reference beams relative to an axis of the other of the first and second reference beams.

* * * * *